United States Patent
Noguchi et al.

(10) Patent No.: US 7,903,279 B2
(45) Date of Patent: Mar. 8, 2011

(54) IMAGE FORMING APPARATUS INCLUDING ADJUSTMENT PROCESSING AND CONTROL METHOD THEREFOR

(75) Inventors: Junichi Noguchi, Suzhou (CN); Yoritsugu Maeda, Toride (JP)

(73) Assignee: Canon Kabushiki Kaisha (JP)

( * ) Notice: Subject to any disclaimer, the term of this patent is extended or adjusted under 35 U.S.C. 154(b) by 1124 days.

(21) Appl. No.: 11/608,424

(22) Filed: Dec. 8, 2006

(65) Prior Publication Data

US 2007/0133056 A1 Jun. 14, 2007

(30) Foreign Application Priority Data

Dec. 12, 2005 (JP) .................................. 2005-358160

(51) Int. Cl.
G06K 15/02 (2006.01)
G06K 1/00 (2006.01)
G06F 3/12 (2006.01)

(52) U.S. Cl. ........................... 358/1.2; 358/1.9; 358/1.13

(58) Field of Classification Search ................... 358/1.2, 358/1.9, 1.13, 3.1, 3.12, 1.12, 1.18; 399/27, 399/46, 49, 51, 53, 72, 301, 302

See application file for complete search history.

(56) References Cited

U.S. PATENT DOCUMENTS

2004/0136738 A1* 7/2004 Yamamoto et al. ............. 399/49

FOREIGN PATENT DOCUMENTS

JP 2002-091096 A 3/2002
JP 3450402 B2 7/2003

* cited by examiner

*Primary Examiner* — Thomas J Lett
(74) *Attorney, Agent, or Firm* — Rossi, Kimms & McDowell LLP

(57) ABSTRACT

Adjustment processing is suitably executed in accordance with the type of post processing. To accomplish this, an image forming apparatus includes, for example, an adjustment part, specifying part, and control part. The adjustment part performs at least one of adjustment operation for an image formation position and adjustment operation for an image formation density by forming adjustment patterns using a developing material on an image carrier and measuring the adjustment patterns. The specifying part specifies the size of an image to be formed on a sheet and the content of post processing in case of executing a job which requires post processing on the sheet. The control part controls, in accordance with the size of the image and the content of the post processing, whether to perform the adjustment operation by the adjustment part concurrently with the formation of an image made from a job requiring post processing.

8 Claims, 16 Drawing Sheets

IMAGE FORMING APPARATUS INCLUDING ADJUSTMENT PROCESSING AND CONTROL METHOD THEREFOR

BACKGROUND OF THE INVENTION

1. Field of the Invention

The present invention relates to an image forming apparatus using an electrophotographic scheme, an electrostatic recording scheme, or the like.

2. Description of the Related Art

In general, an image forming apparatus forms visible images (toner images) by applying a developing material (e.g., toner) to electrostatic latent images formed on photosensitive drums, and primarily transfers the formed visible images to an intermediate transfer material. The image forming apparatus then secondarily transfers the primarily transferred toner images altogether onto a recording material.

In an image forming apparatus of this type, a "density shift" may occur for each color due to variations in transfer characteristic based on a toner residual amount and/or ambient temperature. In an image forming apparatus using a plurality of photosensitive drums, so-called "color misalignment" may occur. "Color misalignment" occurs when the image formation positions of toner images of the respective colors disagree due to the mechanical mounting errors between the respective photosensitive drums, errors in the optical path length between laser beams, and/or changes in optical path.

In general, automatic adjustment for "density shift" is executed by the following procedure. First of all, reference patterns using toner images are formed on a photosensitive drum or an intermediate transfer belt. Photosensors detect the densities of the formed toner images. Process conditions or correction values for Y (gamma) characteristics are automatically controlled to make the detection results have predetermined values. This makes it possible to stabilize the image density.

On the other hand, automatic adjustment for "color misalignment" is executed by the following procedure. First of all, photosensors read reference patterns of the respective colors which are formed on an intermediate transfer material by the respective image forming parts. The photosensors are placed adjacent to a photosensitive drum located on the most downstream position. The positions of reference patterns of the respective colors on the intermediate transfer material are detected on the basis of the read results. Automatic adjustment of the output timings of image signals to be recorded or image signals themselves is electrically performed to set predetermined intervals between the reference patterns of the respective colors. It suffices to automatically adjust an optical path length by driving a return mirror provided in the optical path of a laser beam.

The automatic adjustment disclosed in Japanese Patent No. 3450402 normally demands maximum density correction and gray level correction for each color. In addition, in automatic adjustment of color misalignment, it is necessary to form reference patterns several times so as to reduce errors such as the decentering of a driving system. Therefore, it may take several minutes to execute automatic adjustment.

In addition, in consecutively forming images on a plurality of sheets, the apparatus may execute these automatic adjustment operations between the end of image formation on a given sheet and the start of image formation on the next sheet (a so-called sheet-to-sheet interval). In this case, the apparatus cannot perform image formation until the completion of automatic adjustment. This leads to a reduction in productivity and long waiting times.

Japanese Patent Application Laid-Open No. 2002-91096 discloses an automatic adjustment method of adjusting the number of reference patterns to be formed on a sheet-to-sheet interval secured on an intermediate transfer belt.

However, with an increase in the speed of image forming apparatuses and an improvement in productivity, the sheet-to-sheet interval has become shorter than that in conventional apparatuses. This makes it difficult to form a sufficient number of reference patterns on the sheet-to-sheet interval. If the sheet-to-sheet interval increases for automatic adjustment, the down time undesirably increases. It is therefore preferable to minimize the execution of automatic adjustment which requires an increase in sheet-to-sheet interval.

In addition, the above conventional technique gives no consideration to the type of post processing to be executed for a recording material on which an image is formed. However, there is a possibility that automatic adjustment processing cannot be executed depending on the type of post processing to be performed.

SUMMARY OF THE INVENTION

The present invention can be implemented in an image forming apparatus. The image forming apparatus includes, for example, an adjustment part, a specifying part, and a control part. The adjustment part performs at least one of adjustment operation for an image formation position and adjustment operation for an image formation density by forming adjustment patterns using a developing material on an image carrier and measuring the adjustment patterns. The specifying part specifies the size of an image to be formed on a sheet and the content of post processing in case of executing a job that requires post processing on the sheet. The control part controls, in accordance with the size of the image and the content of the post processing, whether to perform the adjustment operation by the adjustment part concurrently with the formation of an image made from a job requiring post processing.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Example of Arrangement of Each Component>

Figure 1:
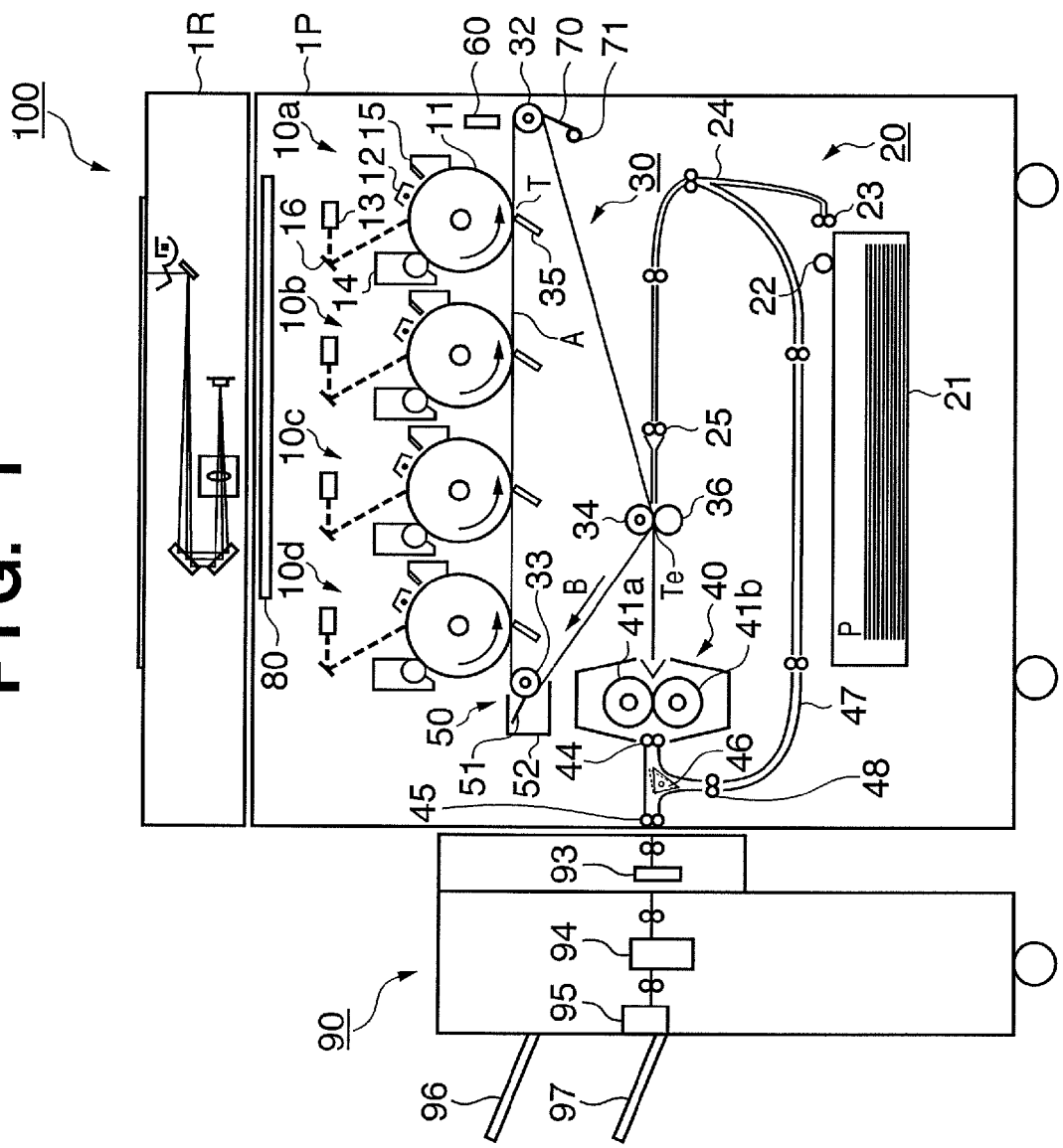
FIG. 1 is a schematic sectional view showing the overall arrangement of an image forming apparatus according to an embodiment.

FIG. 1 is a schematic sectional view showing the overall arrangement of an image forming apparatus according to an embodiment. As an example of the image forming apparatus, an electrophotographic color copying machine will be described, which has a plurality of image forming parts arranged in parallel and use an intermediate transfer scheme. Note that the present invention is suitably applicable to a one-drum type image forming apparatus using a single image carrier as well as a tandem type image forming apparatus using a plurality of image carriers. Note that an image forming apparatus can be implemented as a printing apparatus, printer, copying machine, multifunctional peripheral, or facsimile apparatus.

In this embodiment, an image forming apparatus (color copying machine) 100 includes an image reading part 1R and an image output part 1P. The image reading part 1R optically reads a document image, converts the read image into an electrical signal, and transmits it to the image output part 1P. The image output part 12 includes four image forming parts 10a, 10b, 10c, and 10d (to be simply referred to as image forming parts 10 hereinafter) arranged side by side, a paper feed unit 20, an intermediate transfer unit 30, a fixing unit 40, cleaning units 50 and 70, photosensors 60, and a control unit 80.

The respective image forming parts 10 may basically have the same arrangement. That is, each image forming part 10 includes a photosensitive drum 11 which is axially supported to be rotatable, and rotates in the direction indicated by the arrow. The photosensitive drum 11 is a drum-like electrophotographic photoreceptor serving as a first image carrier. A primary charger 12, exposure device 13, return mirror 16, developing device 14, and cleaning device 15 are arranged along the rotating direction of each photosensitive drum 11 so as to face its outer surface.

The primary charger 12 uniformly applies electric charges to the surface of the photosensitive drum 11. A light beam (e.g., a laser beam) output from the exposure device 13 is applied to the photosensitive drum 11 via the return mirror 16. This forms an electrostatic latent image on the surface of the photosensitive drum 11. Obviously, this light beam has been modulated in accordance with an image signal output from the image reading part 1R or the control unit 80.

The developing devices 14 respectively accommodating developing materials (to be referred to as "toners" hereinafter) of four colors, i.e., yellow, cyan, magenta, and black, develop the electrostatic latent images. Each developed visible image (toner image) is primarily transferred onto an intermediate transfer belt 31 in a corresponding primary image transfer area T. The intermediate transfer belt 31 is a belt-like intermediate transfer material, which functions as a second image carrier as a component of the intermediate transfer unit 30.

On the downstream side of the primary image transfer area T, the cleaning device 15 removes toner left on the photosensitive drum 11 without being transferred. The above process executes image formation by each toner.

The paper feed unit 20 includes a cassette 21, pickup rollers 22, a feed roller pair 23, a paper feed guide 24, and registration rollers 25. The cassette 21 accommodates recording materials P. The pickup rollers 22 feed the recording materials P one by one from the cassette 21. The feed roller pair 23 further conveys the recording material P fed from the pickup rollers 22 toward the image forming part 10. The paper feed guide 24 guides the conveyed recording material P. The registration rollers 25 sends out the recording material P to a secondary transfer area Te in accordance with the image formation timing of each image forming part 10.

Note that this arrangement may include a plurality of cassettes 21. In this case, the first cassette accommodates A4 sheets in portrait position. The second cassette 21 accommodates A4 sheets in landscape position. The arrangement may additionally include the third cassette for accommodating A3 sheets. The control unit 80 gives an instruction to feed sheets from a specific one of the cassettes.

The intermediate transfer unit 30 will be described in detail. The intermediate transfer belt 31 is tightly wound around a drive roller 32, driven roller 33, and secondary transfer opposed roller 34. The drive roller 32 is a roller which transmits driving force to the intermediate transfer belt 31. The driven roller 33 is a tension roller which gives proper tension to the intermediate transfer belt 31, and follows the rotation of the intermediate transfer belt 31. A primary transfer plane A is formed on the surface of the intermediate transfer belt 31 located between the drive roller 32 and the driven roller 33. A pulse motor (not shown) rotates the drive roller 32.

A primary transfer charger 35 is placed in each primary transfer area T where each photosensitive drum 11 faces the intermediate transfer belt 31. The primary transfer charger 35 is in contact with the backside of the intermediate transfer belt 31. A secondary transfer roller 36 faces the secondary transfer opposed roller 34. The nip portion between the secondary transfer roller 36 and the intermediate transfer belt 31 forms the secondary transfer area Te. The secondary transfer roller 36 is pressed against the intermediate transfer belt 31 with a proper pressure.

The cleaning unit 50 for cleaning the image formation surface of the intermediate transfer belt 31 is placed on the downstream side of the secondary transfer area Te of the intermediate transfer belt 31. The cleaning unit 50 comprises a cleaning blade 51 for removing toner on the intermediate transfer belt 31 and a waste toner box 52 which stores waste toner.

The drive roller 32 comprises the cleaning units 70 such as cleaning blades and a pulse motor 71 for moving the cleaning units 70 to bring them into contact with or separate them from the intermediate transfer belt 31. The cleaning units 70 also serve to remove toner on the intermediate transfer belt 31.

The fixing unit 40 includes a fixing roller 41a incorporating a heat source such as a halogen heater, and a press roller 41b which is pressed against the fixing roller 41a. The fixing unit 40 comprises inside delivery rollers 44 and outside delivery rollers 45 which are used to guide the recording material P delivered from the roller pair comprising the fixing roller 41a an the press roller 41b to the outside of the apparatus.

This apparatus includes a flapper 46 between the inside delivery rollers 44 and the outside delivery rollers 45 to switch between conveying the recording material P to the outside of the apparatus and conveying it to a double-sided path 47. When the flapper 46 is located at the position indicated by the solid line in FIG. 1, a recording material is conveyed outside the apparatus. When the flapper 46 is located at the position indicated by the broken line in FIG. 1, a recording material is conveyed in the direction of the double-sided path 47. Rollers 48 can rotate forward and backward, and can convey the recording material, conveyed to the double-sided path 47 via the flapper 46, in the direction of the outside delivery rollers 45 upon reversing the convey direction of the recording material and inverting the obverse and reverse surfaces of the recording material.

A recording material is normally conveyed to the post processing device 90 with the obverse and reverse surfaces being inverted. This makes it possible to correct the page order of recording materials on which images are recorded such that the first page comes first. Since techniques associated with the double-sided path 47 and the obverse/reverse inverting mechanism are known techniques, a description thereof will be omitted.

A post processing device 90 is a unit which executes some kind of post processing for the recording material P output from the image output part 1P. A punching device 93 is a unit which forms two or three holes in the recording material P. A stapling device 94 is a unit which forms a recording material bundle by bundling a plurality of recording materials P and aligning them, and staples the recording material bundle. A shift unit 95 is a unit which shifts (offsets), for example, a recording material bundle obtained by a preceding job and a recording material bundle obtained by a succeeding job so as to sort them from each other. Delivery trays 96 and 97 are units on which recording materials P are stacked.

Figure 2:
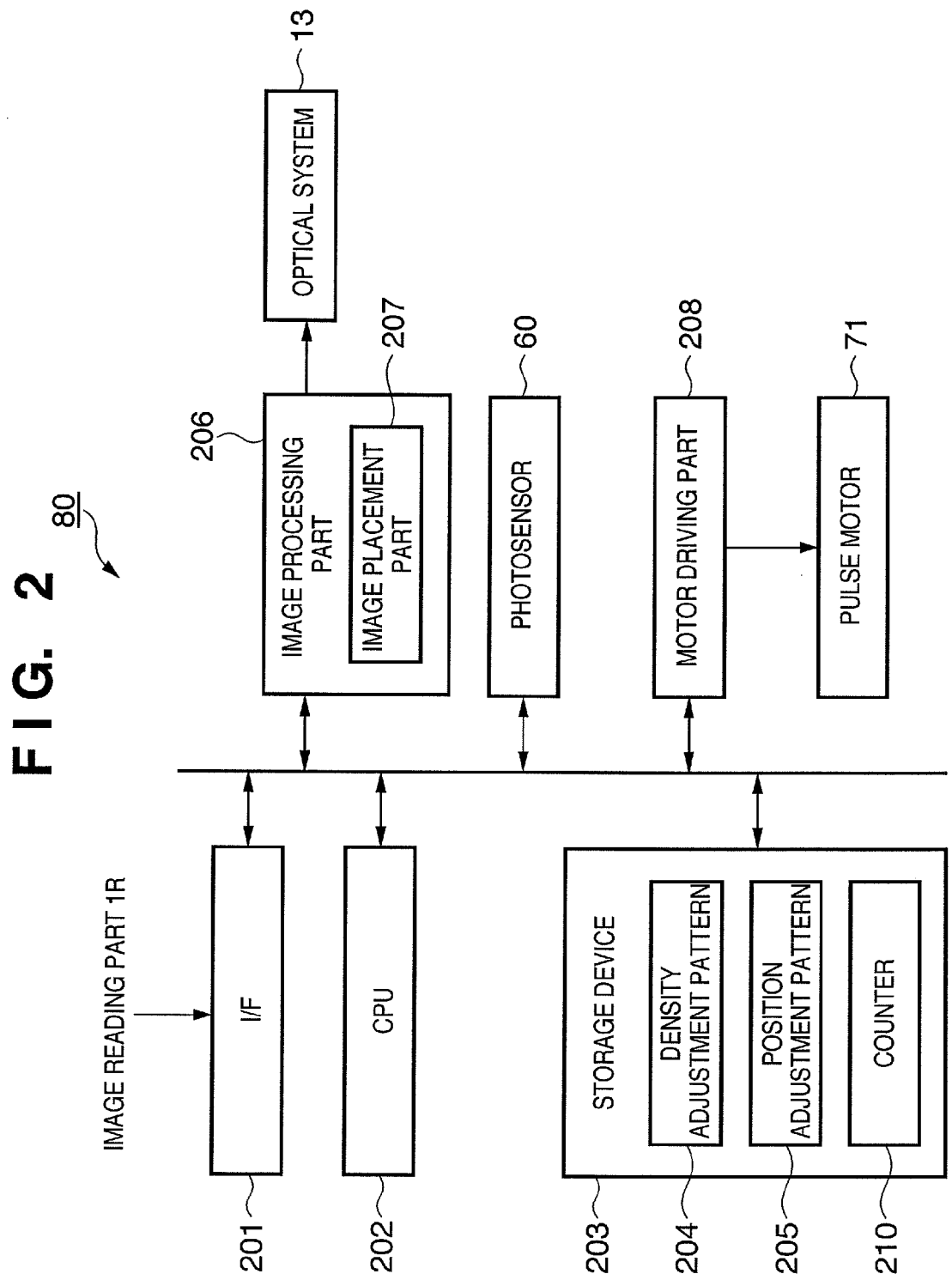
FIG. 2 is a block diagram exemplifying a control unit according to the embodiment.

FIG. 2 is a block diagram exemplifying a control unit associated with the embodiment. An I/F part 201 is a circuit which receives an image signal from the image reading part 1R. A CPU 202 is a control circuit for controlling the operation of a mechanism in each unit described above. The CPU 202 automatically adjusts an image formation position on the basis of the formation positions of the adjustment patterns read by the photosensors 60. The CPU 202 also automatically adjusts an image formation density on the basis of the densities of the read adjustment patterns. In this manner, the CPU 202 functions as an adjustment part which adjusts at least one of an image formation position and an image formation density by forming adjustment patterns using a developing material on an image carrier and measuring the adjustment patterns. The CPU 202 also decides the size of an image as a formation target. If the size of the image (e.g., A3) is larger than a predetermined size (e.g., A4), the CPU 202 can perform control to interrupt the formation of adjustment patterns.

A storage device 203 is a storage circuit such as a RAM, ROM, or hard disk drive. The storage device 203 stores image data 204 of density adjustment patterns, image data 205 of position adjustment patterns, and a counter for counting the number of images formed. In automatically adjusting an image formation density, the CPU 202 reads out and uses the image data 204 of density adjustment patterns. When automatically adjusting an image formation position, the CPU 202 reads out and uses the image data 205 of position adjustment patterns. Counter data 210 is the total number of images formed (the counted number of images). The CPU 202 uses the counter data 210 to determine the execution timing for automatic adjustment.

An image processing circuit 206 is a circuit which generates an image signal based on an image as a formation target and outputs it to the exposure device 13. An image placement part 207 as a function of an image processing part 206 is a circuit which determines the placement of an image as a formation target so as to secure, on the intermediate transfer belt 31, a free space for the formation of an adjustment pattern when forming an image equal to or smaller than a predetermined size.

The image placement part 207 secures a free space outside an image formation area in the main scanning direction by determining the placement of an image such that a short side of the image coincides with the main scanning direction (perpendicular to the convey direction of the intermediate transfer belt 31) on the intermediate transfer belt 31. The image placement part 207 has an image rotation function of rotating an image as a formation target such that a short side of the image coincides with the main scanning direction, when a long side of the image coincides with the main scanning direction of the intermediate transfer belt 31. For example, this function can rotate an A4-size image through 90° to obtain an A4R-size image. Obviously, the CPU 202 and control programs may control all the processing in the image placement part 207. In this manner, the image placement part 207 functions as an image rotation part which rotates an image to secure formation areas for adjustment patterns on an image carrier.

A motor driving part 208 is a driving circuit for driving the pulse motor 71, various kinds of motors, and the like. The motor driving part 208 drives the pulse motor 71 in accordance with, for example, an instruction from the CPU 202 to bring the cleaning units 70 into contact with the intermediate transfer belt 31. This removes adjustment patterns. On the other hand, after the completion of cleaning of the adjustment patterns, the motor driving part 208 drives the pulse motor 71 to separate the cleaning units 70 from the intermediate transfer belt 31.

<Example of Operation of Each Component in Image Formation Processing>

When the CPU 202 generates a start signal for image formation, the pickup roller 22 picks up the recording materials P one by one from the cassette 21 accommodating recording materials of the size designated by the CPU 202. A recording material is also called, for example, a recording medium, paper, sheet, or transfer material or transfer sheet. The feed roller pair 23 conveys the recording material P to the registration rollers 25 along the paper feed guide 24. The CPU 202 rotates the registration rollers 25 in accordance with the start timing of image formation. This timing is set to match the toner image primarily transferred onto the intermediate transfer belt 31 with the recording material P in the secondary transfer area Te.

The four image forming parts 10 multi-transfers toner images of four colors on the intermediate transfer belt 31. Thereafter, when the recording material P enters the secondary transfer area Te and comes into contact with the intermediate transfer belt 31 the CPU 202 applies a high voltage to the secondary transfer roller 36 in accordance with the passage timing of the recording material P. This transfers the toner images of the four colors onto the surface of the recording material P. The recording material P is accurately guided to the nip portion between the fixing roller 41a and the press roller 41b. The heat generated by the fixing roller 41a and the pressure generated by the press roller 41b heat and fix the toner image on the surface of the recording material P. The recording material P conveyed by the inside delivery rollers 44 and the outside delivery rollers 45 is delivered to the post processing device 90.

<Automatic Adjustment Processing in Image Forming Apparatus>

Figure 3:
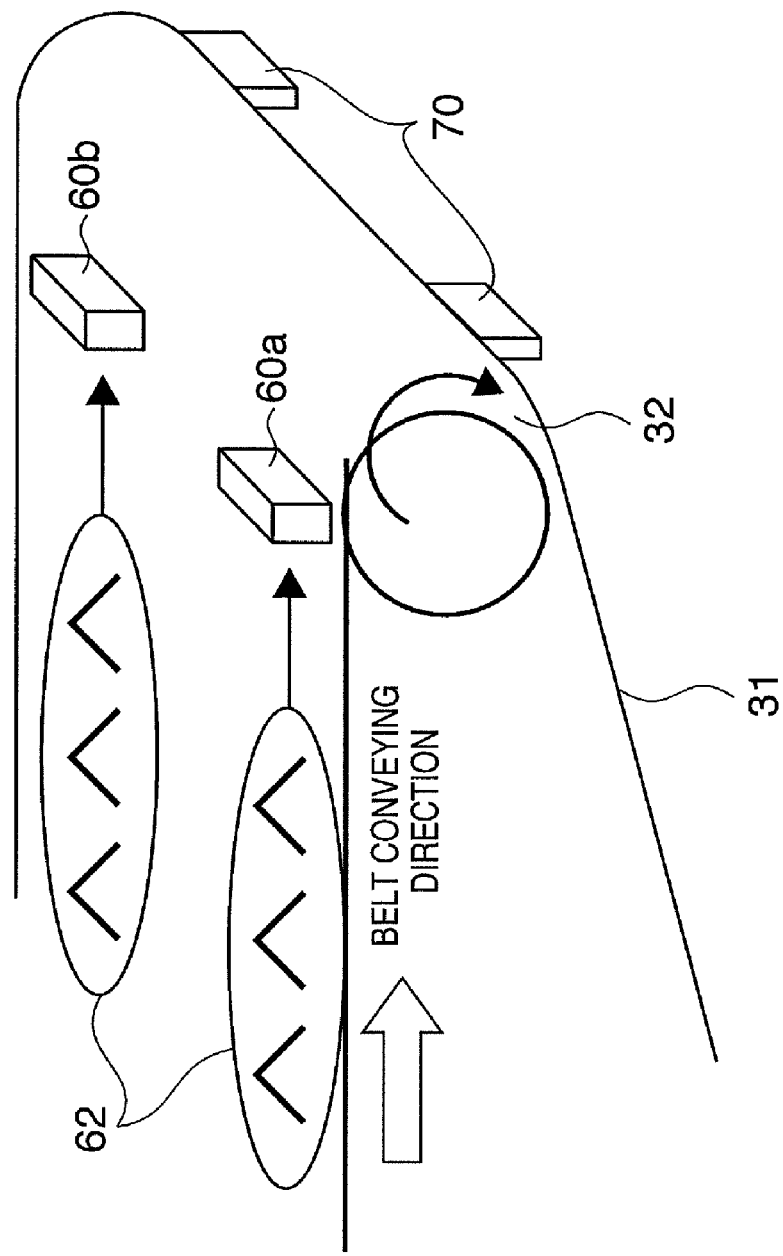
FIG. 3 is a view showing an example of how position adjustment patterns according to the embodiment are formed.

FIG. 3 is a view showing an example of how position adjustment patterns according to this embodiment are formed. Photosensors 60, i.e., 60a and 60b, as pattern reading parts are arranged between the drive roller 32 and the photosensitive drum 11, of a plurality of photosensitive drums, which is located on the most downstream position in the belt travel direction. The photosensors 60a and 60b read patterns 61 for image formation position adjustment (also called registration correction) which are formed on the intermediate transfer belt 31.

In this embodiment, the CPU 202 reads out the image data 205 of the position adjustment patterns 61 from the storage device 203, sends out the data to the image processing part 206, and forms the position adjustment patterns 61 at predetermined positions on the intermediate transfer belt 31 as references. Obviously, the patterns 61 are formed as toner images. The CPU 202 reads the patterns 61 by using the photosensors 60, and detects the error of the image formation position (registration) on the photosensitive drum for each color. For example, the CPU 202 detects the distance from a predetermined position to the formation start position of a position adjustment pattern as an error. Finally, the CPU 202 stores data for correcting the detected error in the storage device 203, and controls subsequent image formation processing so as to cancel the data in the image formation processing.

<Automatic Adjustment Processing for Image Formation Density>

Figure 4:
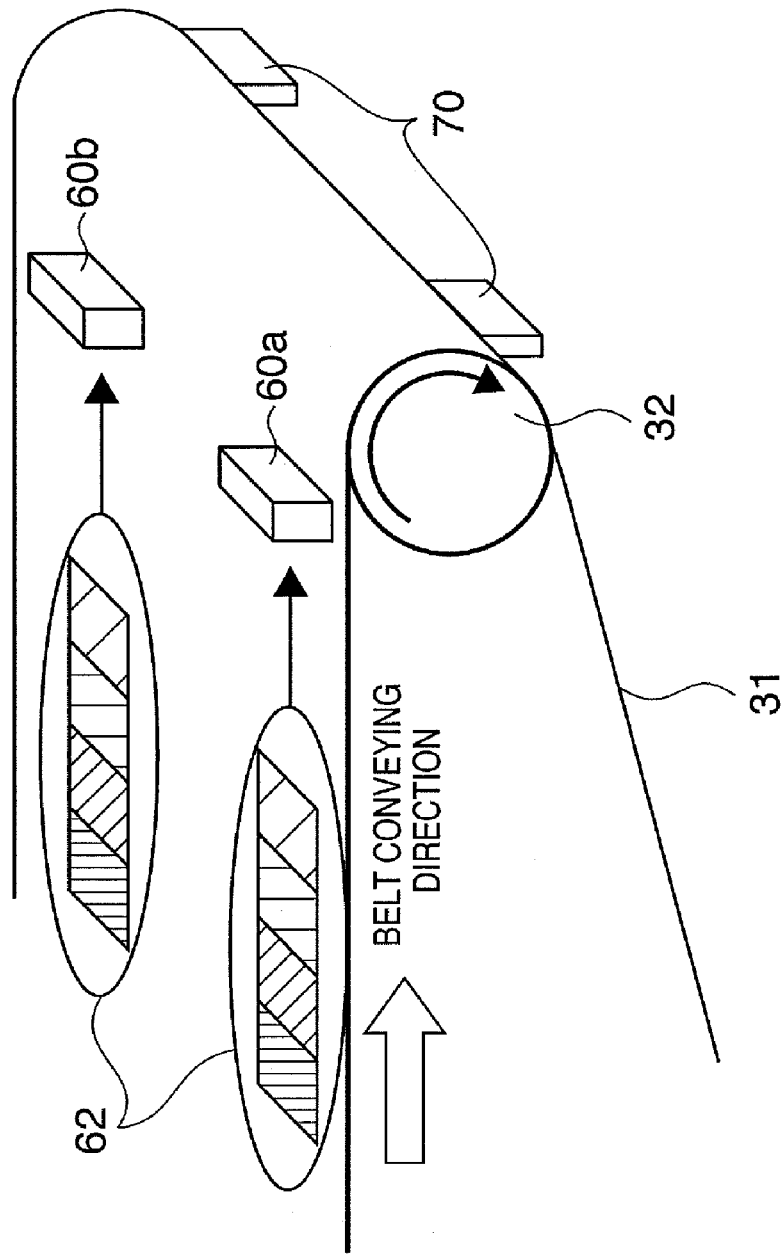
FIG. 4 is a view showing an example how density adjustment patterns according to the embodiment are formed.

FIG. 4 is a view showing an example of how density adjustment patterns are formed. The CPU 202 reads out the image data 204 of the density adjustment patterns from the storage device 203, sends out the data to the image processing part 206, and form density adjustment patterns 62 on the intermediate transfer belt 31. The CPU 202 causes the photosensors 60 to read the patterns 62, and adjusts each process condition in accordance with the densities of the read patterns 62. This makes it possible to maintain a predetermined density and gray level characteristics. Note that this apparatus also adjusts the data of a gray level correction table.

Note that using the photosensors 60, i.e., 60a and 60b, as parts which read the density adjustment patterns 62 as well as the adjustment patterns 61 for an image formation position makes it possible to decrease the number of parts required and effectively use the space inside the apparatus.

As can be seen from FIGS. 3 and 4, the cleaning units (e.g., cleaner blades) 70 are placed at near an end portion of the intermediate transfer belt 31 which is located in the direction (the main scanning direction) perpendicular to the belt convey direction (the sub-scanning direction) in FIGS. 3 and 4. Such positions are set to remove the position adjustment patterns 61 and the density adjustment patterns 62 without removing the image transferred on the sheet. As in usual cases, an A4R image and the like can be formed in an area with which the cleaning units 70 do not come into contact (the area between the two cleaning units 70). This makes it possible to automatically adjust an image formation position or an image formation density even during the execution of image formation.

The pulse motor 71 brings the cleaning units 70 into contact with the intermediate transfer belt 31 at the time of formation of position adjustment patterns and density adjustment patterns. When forming an A4-size image or A3-size image, the apparatus uses almost the entire area of the intermediate transfer belt 31 in the main scanning direction. In this case, the apparatus cannot sufficiently secure an area for the formation of adjustment patterns, and hence cannot execute automatic adjustment. The CPU 202 therefore moves the cleaning units 70 to separate them from the intermediate transfer belt 31 by driving the pulse motor 71.

<Example of Adjustment Pattern Formation Position>

Figure 5:
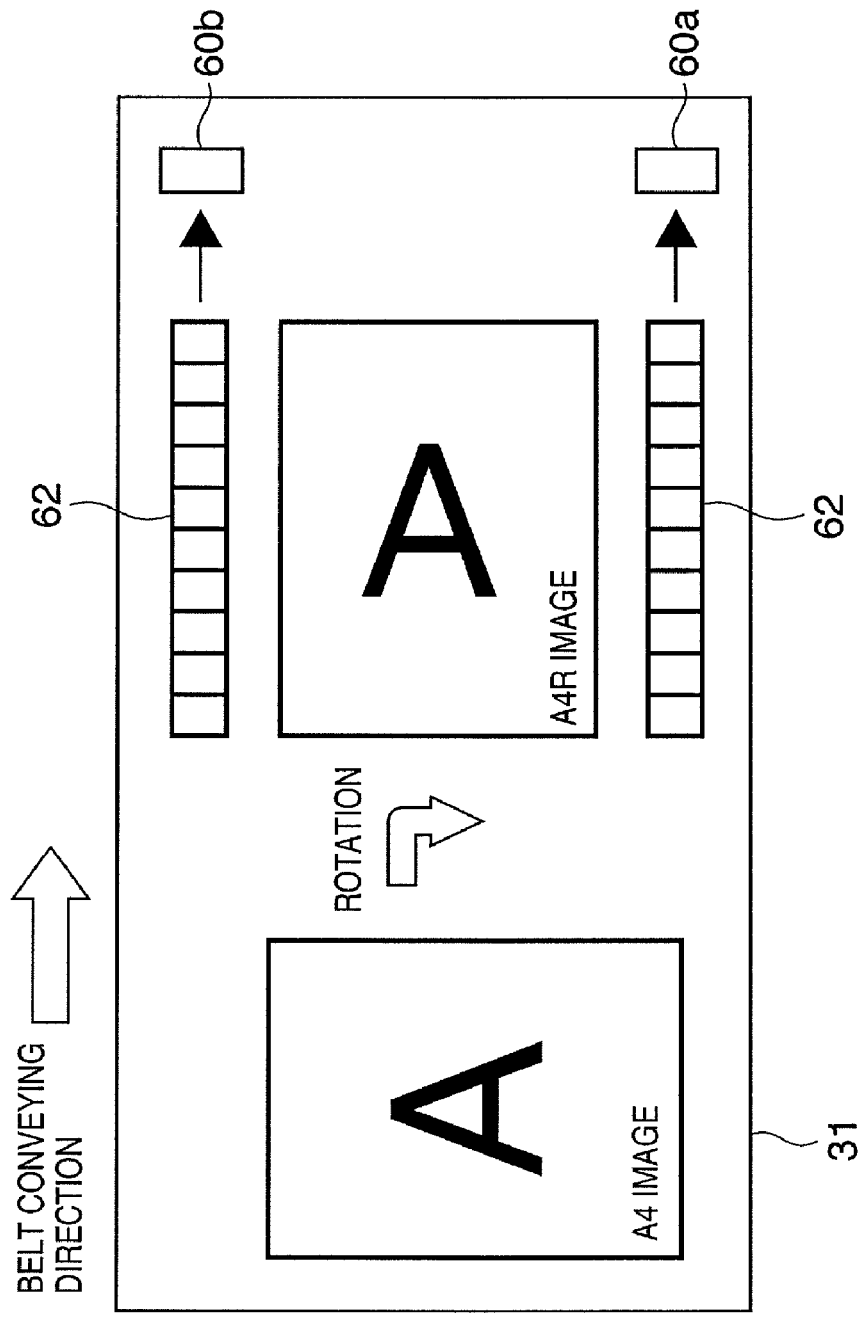
FIG. 5 is a plan view exemplifying the formation positions of adjustment patterns according to the embodiment.

FIG. 5 is a plan view exemplifying the formation positions of adjustment patterns according to the embodiment. As can be seen from FIG. 5, when forming an A4-size image, it lacks in area for the formation of the adjustment patterns 61 or 62. Therefore, the A4-size image is rotated through 90° to be converted into the A4R-size image (with its short side being parallel to the main scanning direction). In addition, this image is transferred onto almost the center of the intermediate transfer belt 31 in the main scanning direction. This makes it possible to secure sufficient free areas (i.e., areas which allow the formation of adjustment patterns) on the end portion of the intermediate transfer belt 31 in the main scanning direction.

If, therefore, the size of an image to be formed is equal to or smaller than a predetermined size, it suffices if the image placement part 207 rotates the image through 90°, and the output timing of the image signal is adjusted to locate the image in almost the center of the intermediate transfer belt 31 in the main scanning direction. The predetermined size is, for example, A4 (210*297 mm) or LTR (216*279 mm) which is generally called a small size. This makes it possible to secure areas which allow the formation of adjustment patterns without influencing an image as a formation target. The apparatus then forms the position adjustment patterns 61 or density adjustment patterns 62 in the secured areas.

According to this embodiment, providing the two sensors 60 for detecting adjustment patterns at two end portions of the intermediate transfer belt 31 allows an image rotated through 90° to be located almost in the center in the main scanning direction. If, however, the sensor 60 is provided at only one end portion of the intermediate transfer belt 31 or an image has a slightly smaller short side, there is no need to place the image almost in the center in the main scanning direction. It suffices instead to determine the placement of an image at a position that allows to secure areas for the formation of adjustment patterns. In this case, the placement of the image is offset from the center of the intermediate transfer belt 31 in the main scanning direction to the end portion.

Finally, this apparatus can form adjustment patterns at the end portion of the transfer belt concurrently with the formation of a normal image, and hence can almost eliminate the time loss in automatic adjustment processing which has been required in the prior art.

Note that the toner image to be used to form an image is maintained on the intermediate transfer belt 31 after only the adjustment patterns are removed by the cleaning units 70 described above. Therefore, unnecessary toner (adjustment patterns) hardly reaches the secondary transfer roller 36. The secondary transfer roller 36 located on the downstream side then transfers the toner image onto the recording material P. The fixing unit 40 fixes the toner image on the surface of the recording material P.

<Control on Execution Timing of Adjustment>

Figure 6:
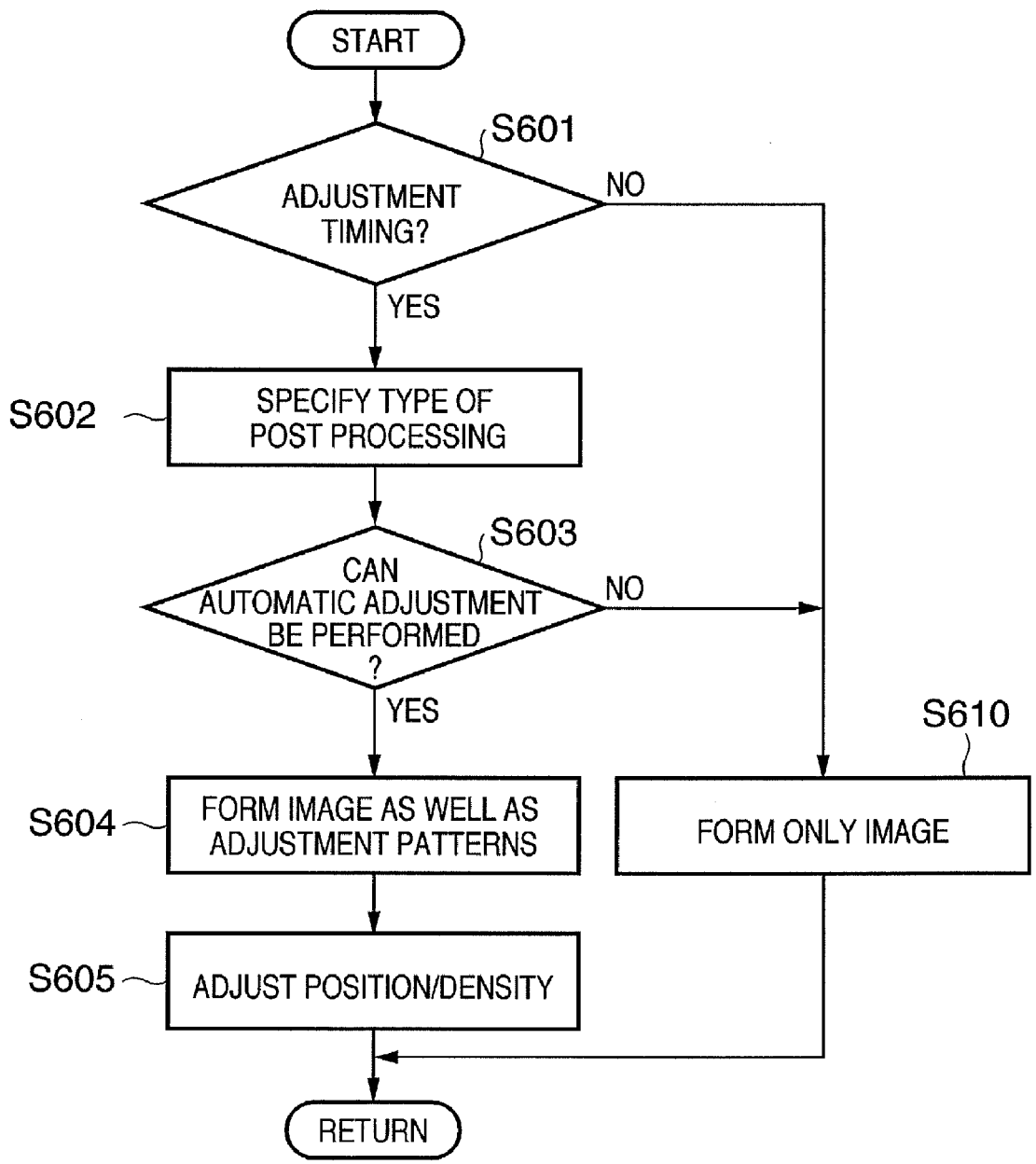
FIG. 6 is a flowchart showing a control method for the execution timing for automatic adjustment according to the embodiment.

FIG. 6 is a flowchart showing an execution timing control method for automatic adjustment according to the embodiment. The simplest case will be described below. Note that the execution timing for automatic adjustment can also be called an adjustment interval.

In step S601, the CPU 202 decides whether the execution timing has come for automatic adjustment. For example, the CPU 202 decides whether the number of image-formed sheets counted by the counter exceeds a predetermined reference number (e.g., 100). The CPU 202 reads out data 210 of the number of image-formed sheets from the storage device 203. In this manner, the CPU 202 functions as a determination part which determines an adjustment execution timing on the basis of the number of image-formed sheets. Note that the execution timing need not be a single value (e.g., 100) but may be a range (e.g., 96 to 105). Letting the execution timing have a range in this manner makes it possible to execute automatic adjustment at a suitable timing such as the segmentation of a set. For example, with regard to a stapling job for five sheets per set, when the number of image-formed sheets reaches 100 in the middle of a given set, it suffices to start automatic adjustment from the next set. If it is decided that the execution timing has come, the process advances to step S602. Otherwise, the process advances to step S610 in which the CPU 202 executes image formation as in a normal case.

In step S602, when executing a job which requires post processing for an image-formed sheet, the CPU 202 acquires the type (content) of post processing for the job as a processing target. The CPU 202 may also acquire the size of an image to be formed on a sheet. That is, the CPU 202 functions as a specifying part which specifies the content of post processing and an image size. The CPU 202 performs this acquisition processing by, for example, analyzing the content of the job. This is because the data of the job contains information which allows to specify the type of post processing.

In step S603, the CPU 202 as a control part decides on the basis of the specified type whether it can execute automatic adjustment while forming the image made from the job which requires post processing on the intermediate transfer belt 31. For example, the CPU 202 can secure formation areas for adjustment patterns on the intermediate transfer belt 31 by rotating the image, and also distinguishes whether the post processing can be executed even if the image is rotated. In this case, the CPU 202 preferably makes a decision while also giving consideration to the specified image size. This is because the area of a free space to be secured on the intermediate transfer belt 31 changes depending on the image size. Post processing which can be executed even if an image is rotated includes, for example, a stapling process (corner stitching) and shift processing by the shift unit 95. A stapling process is the post processing of stapling a recording material bundle. Shift processing is post processing for sorting a plurality of recording material bundles. Post processing which cannot be executed if an image is rotated is, for example, two position stapling of stapling at two positions along a side of a set of sheets or a punch process by the punching device 93.

Figure 7:
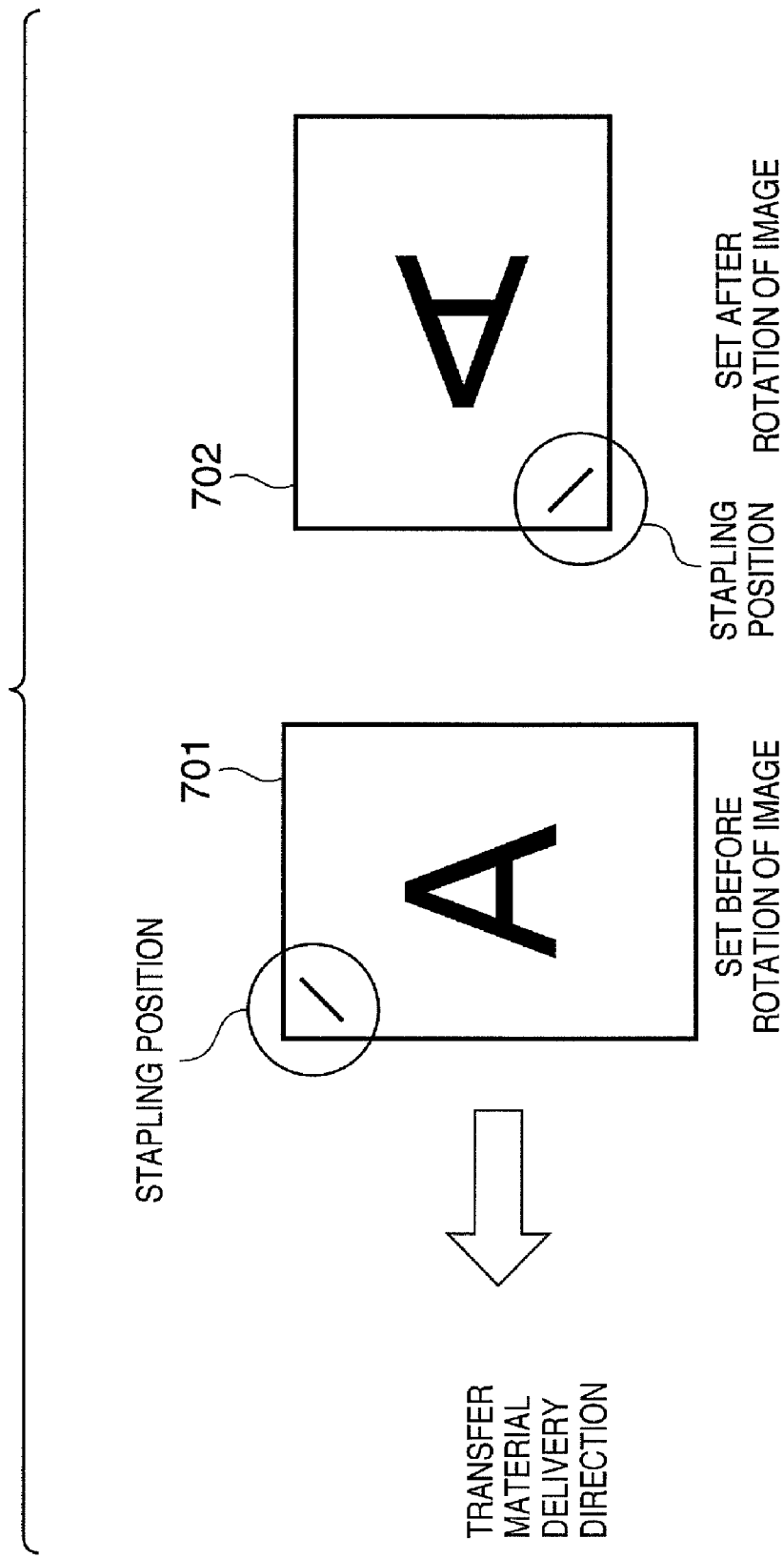
FIG. 7 is a view for explaining the relationship between the rotation of an image and a stapling process according to the embodiment.

FIG. 7 is a view for explaining the relationship between the rotation of an image and a stapling process (corner stitching) according to the embodiment. In practice, recording materials on which images are formed are stapled after being inverted. FIG. 7 shows a recording material viewed from its obverse side. If automatic adjustment processing is not executed, the stapling device 94 executes a stapling process at the upper left end of a recording material 701 (the upper right end of the inverted recording material) on which an A4 image is formed. If automatic adjustment is executed, the stapling device 94 executes a stapling process at the lower left end of a recording material 702 (the lower right end of the inverted recording material) on which an image rotated counterclockwise through 90°. In this manner, the stapling device 94 can change the stapling position. This makes it possible to execute a stapling process without any problem even if an image is rotated for automatic adjustment. However, a stapling device and a punching device are conceivable which can execute two position stapling and a punch process without any problem even if an image is rotated for automatic adjustment. Therefore, a stapling process and a punch process performed by such a stapling device and a punching device are post processing which allows automatic adjustment.

If the CPU 202 decides that it can execute automatic adjustment while forming, on the intermediate transfer belt 31, the image made from the job which requires post processing, the process advances to step S604. If the CPU 202 decides that it cannot execute automatic adjustment, the process advances to step S610 in which the CPU 202 executes normal image formation.

In step S604, the CPU 202 also forms adjustment patterns while forming an image on the intermediate transfer belt 31 upon rotating the image, as needed.

In step S605, the CPU 202 causes the photosensors 60 to read adjustment patterns, and adjusts the image formation position and image formation density.

According to this embodiment, deciding whether automatic adjustment can be executed, while forming, on an image carrier, the image made from a job which requires post processing makes it possible to suitably execute automatic adjustment in accordance with the type of post processing.

For example, the CPU 202 distinguishes whether the specified post processing is post processing which can be executed even if the image is rotated to secure formation areas for adjustment patterns on the image carrier. This is because some post process cannot be executed if an image is rotated for automatic adjustment.

For example, when a punch process is to be executed, rotation of an image makes it impossible to form holes at desired positions. In contrast, a stapling process (corner stitching) and a shift processing can be performed without any problem even if images are rotated. As described above, a job of post processing which poses no problem even upon rotation of an image allows to concurrently form an image and adjustment patterns by rotating the image. This technique therefore has the merit of greatly reducing the down time due to automatic adjustment.

Second Embodiment

This embodiment will describe in detail a method of deciding whether to execute automatic adjustment, in consideration of the image size as well as the type of post processing.

Figure 8:
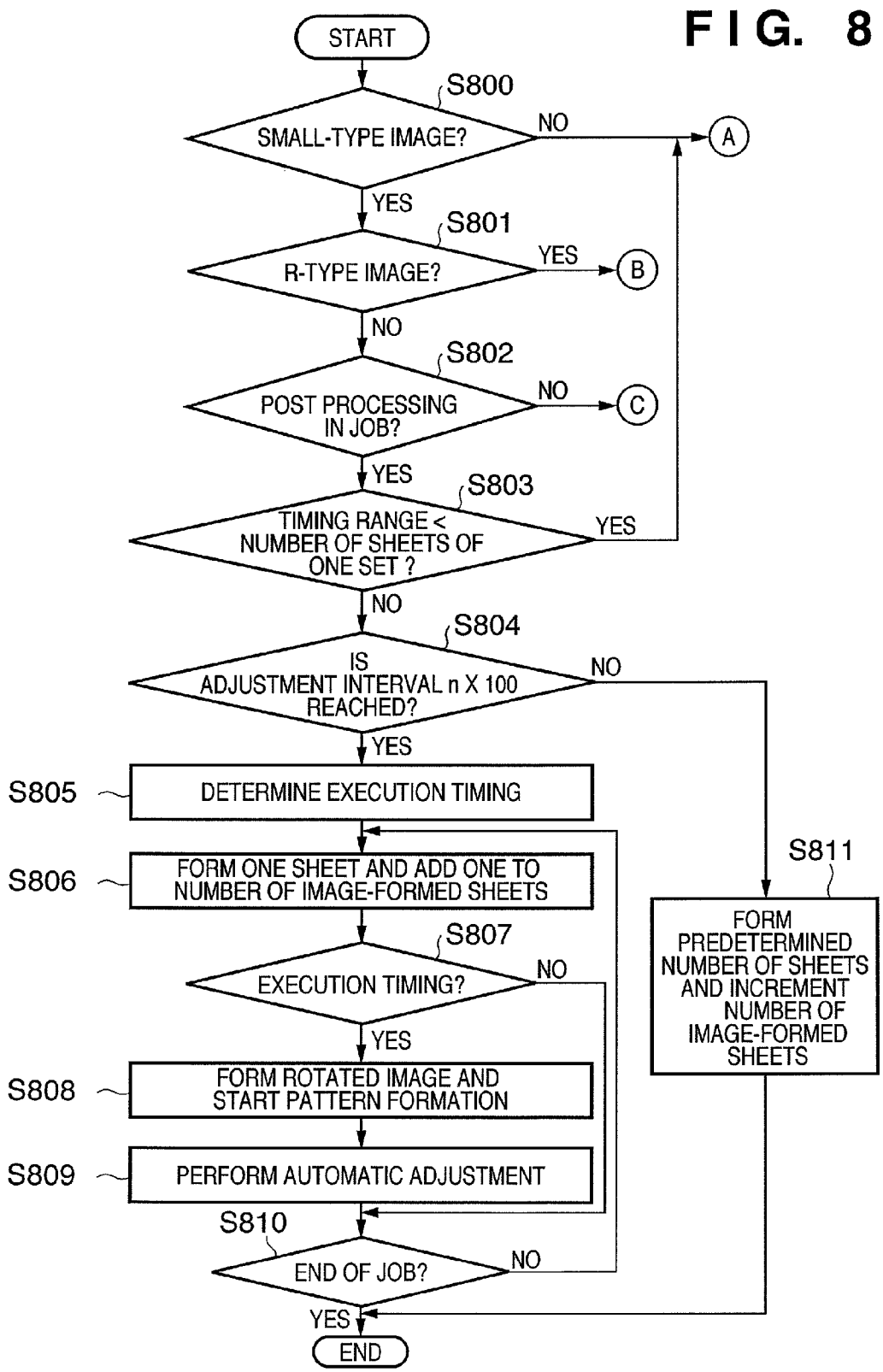
FIG. 8 is a flowchart showing image formation processing and automatic adjustment processing according to the second embodiment.

FIG. 8 is a flowchart showing image forming processing and automatic adjustment processing according to the second embodiment. The same reference numerals as in the first embodiment denote the same parts in the second embodiment, and a description thereof will be omitted.

In step S800, a CPU 202 decides whether an image to be formed is a small-type image. A small type indicates A4 (210*297 mm) or LTR (216*279 mm) generally called a small size. If the image is of a small type, the process advances to step S801. If the image is of a large type, the process advances to a process A. A large type indicates A3 (420*297 mm) or the like generally called a large size. Processing for a large-type image will be described first.

Figure 9:
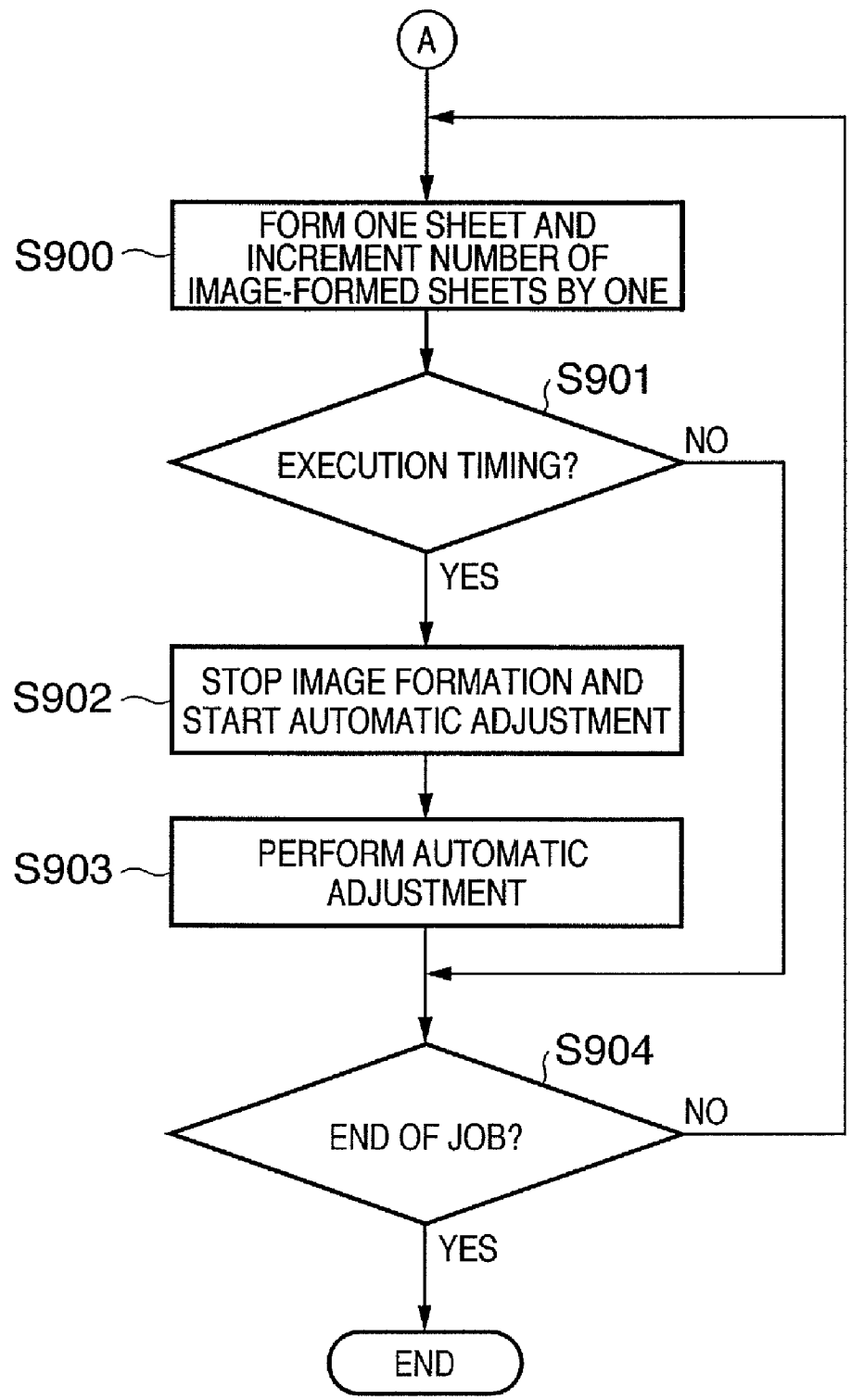
FIG. 9 is a flowchart showing processing for a large-type image according to the embodiment.

FIG. 9 is a flowchart showing processing for a large-type image according to this embodiment. In step S900, the CPU 202 increments the value of the counter by one every time it forms one image. A storage device 203 stores the value of the counter as counter data 210.

In step S901, the CPU 202 decides on the basis of the value of the counter whether the execution timing has come for automatic adjustment. If the execution timing has come for automatic adjustment, the process advances to step S902. If the execution timing has not come, the process advances to step S904.

In step S902, the CPU 202 temporarily interrupts the image forming operation and starts automatic adjustment. The CPU 202 forms adjustment patterns on an intermediate transfer belt 31. In step S903, the CPU 202 causes photosensors 60 to read the adjustment patterns, and adjusts the image formation position and image formation density.

In step S904, the CPU 202 decides whether to end the job. If the CPU 202 decides that it does not end the job, the process returns to step S900 to resume the image formation.

Figure 10:
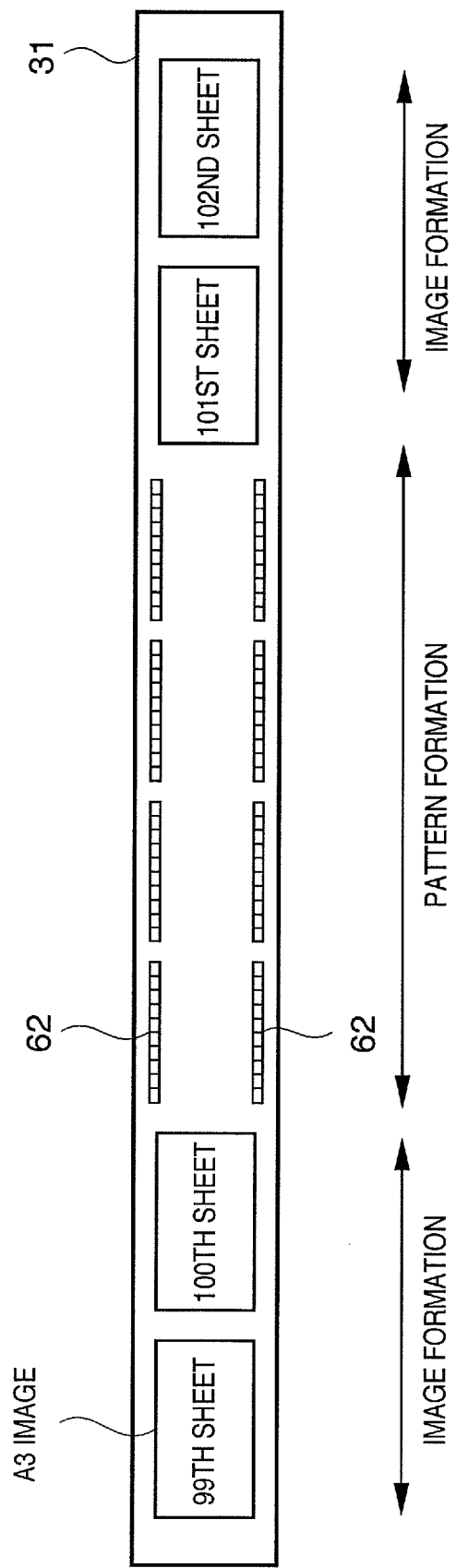
FIG. 10 is a view showing automatic adjustment processing associated with a large-type image according to the embodiment.

FIG. 10 is a view showing automatic adjustment processing associated with a large-type image according to the embodiment. The embodiment uses an A3 image as a large-type image. The intermediate transfer belt 31 in the main scanning direction is not long enough to simultaneously form an A3 image and adjustment patterns. During automatic adjustment, therefore, the CPU 202 must interrupt the formation of an A3 image. In this case, since the execution timing has come for automatic adjustment when the 100th image corresponding to a reference number is formed, the CPU 202 interrupts forming an A3 image, and starts automatic adjustment processing. Upon completing automatic adjustment, the CPU 202 resumes the image formation.

Referring back to the flowchart of FIG. 8, in step S801, the CPU 202 decides whether the current image is an R-type (landscape) image. If the current image is an R-type (landscape) image, the process advances to a process B. If the current image is not an R-type (landscape) image, the process advances to step S802.

Figure 11:
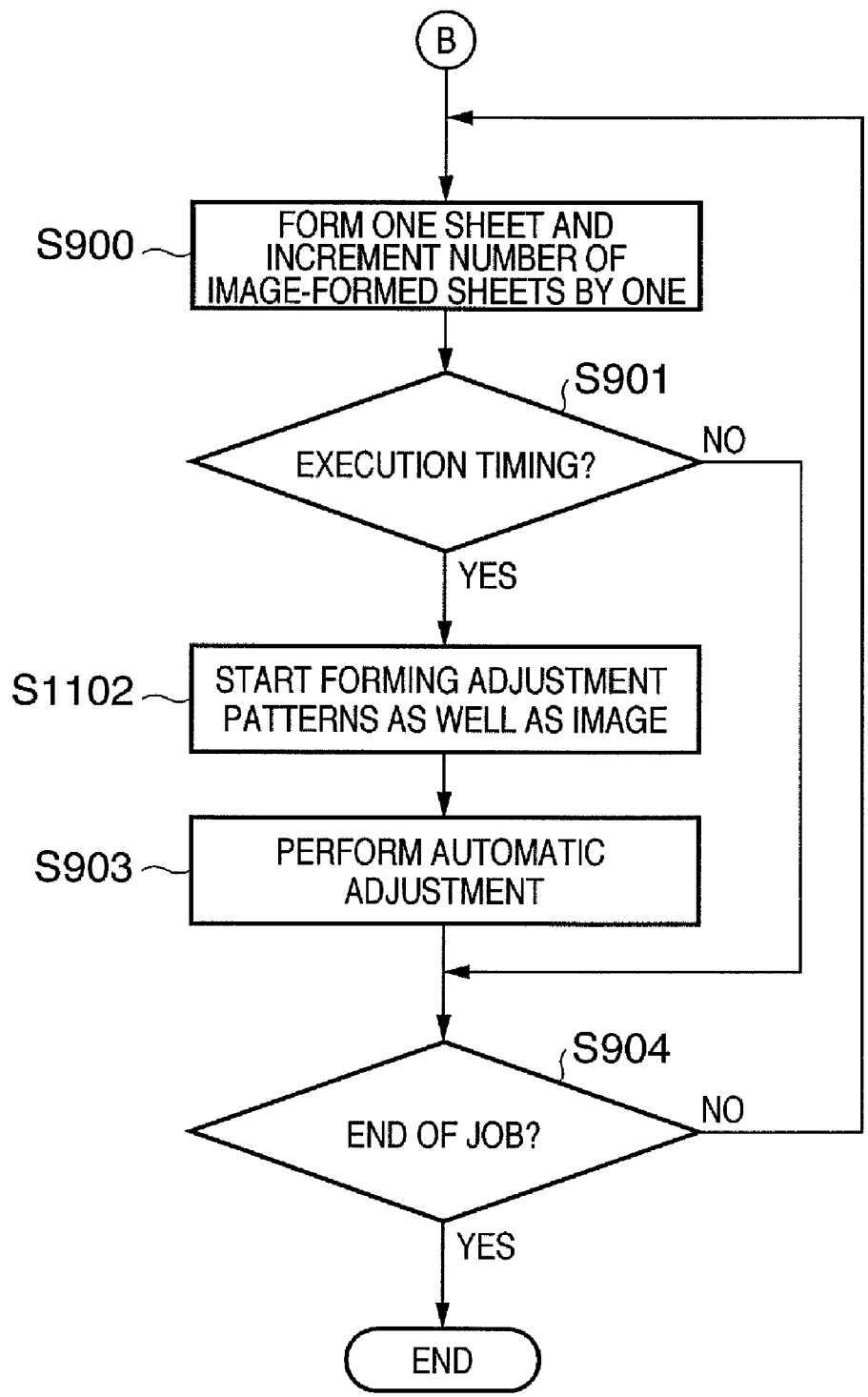
FIG. 11 is a flowchart showing automatic adjustment processing executed while a small-type and R-type (small R-type) image is formed according to the embodiment.

FIG. 11 is a flowchart showing automatic adjustment processing to be executed concurrently with the formation of an R-type (small R-type) image according to the embodiment. Note that the same reference numerals as in FIG. 9 denote common parts in FIG. 11, and a description thereof will be simplified. As compared with FIG. 9, step S1102 replaces step S902.

In step S1102, the CPU 202 starts forming adjustment patterns on the intermediate transfer belt 31 while forming an image. Thereafter, in step S903, the CPU 202 reads the adjustment patterns and adjusts the image formation position and image formation density.

Figure 12:
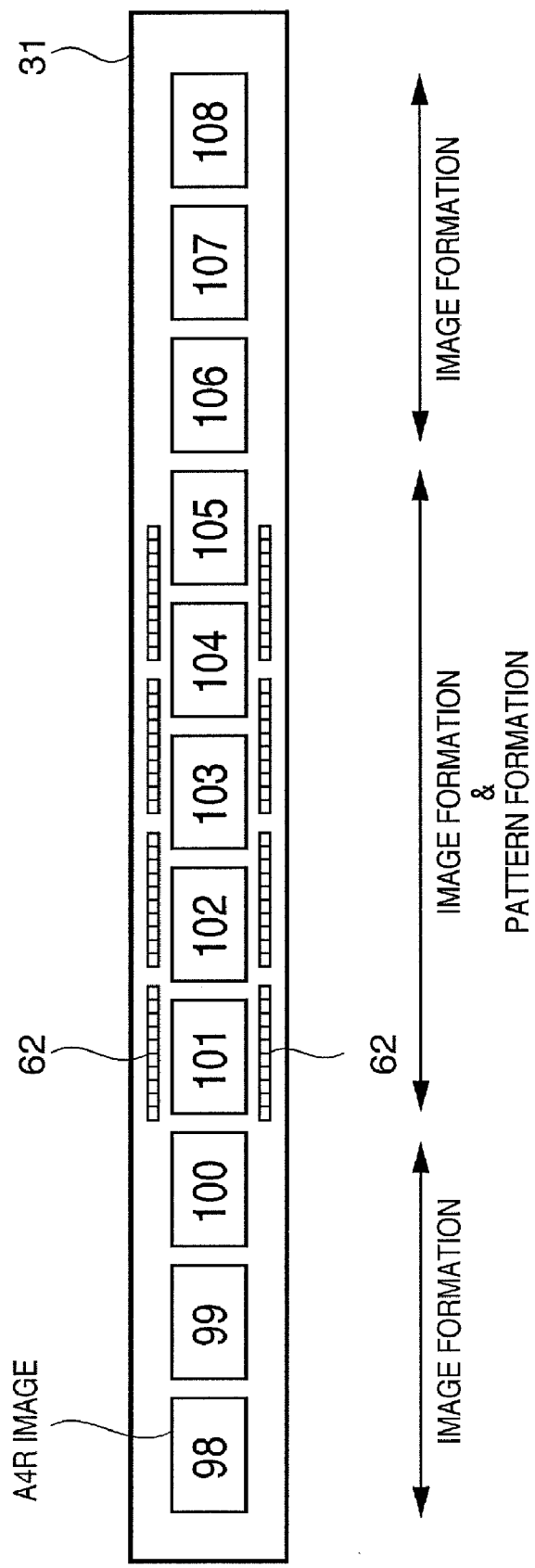
FIG. 12 is a view showing automatic adjustment processing associated with a small R-type image according to the embodiment.

FIG. 12 is a view showing automatic adjustment processing associated with a small R-type image according to the embodiment. According to this example, when the 100th image is formed, the execution timing has come for automatic adjustment. However, the CPU 202 can form a small R-type image concurrently with the formation of adjustment patterns, and hence does not interrupt the image formation. This can reduce the down time due to automatic adjustment.

Referring back to the flowchart of FIG. 8, in step S802, the CPU 202 decides whether the job includes post processing. If YES in step S802, the process advances to step S803. If NO in step S802, the CPU 202 executes a process C.

Figure 13:
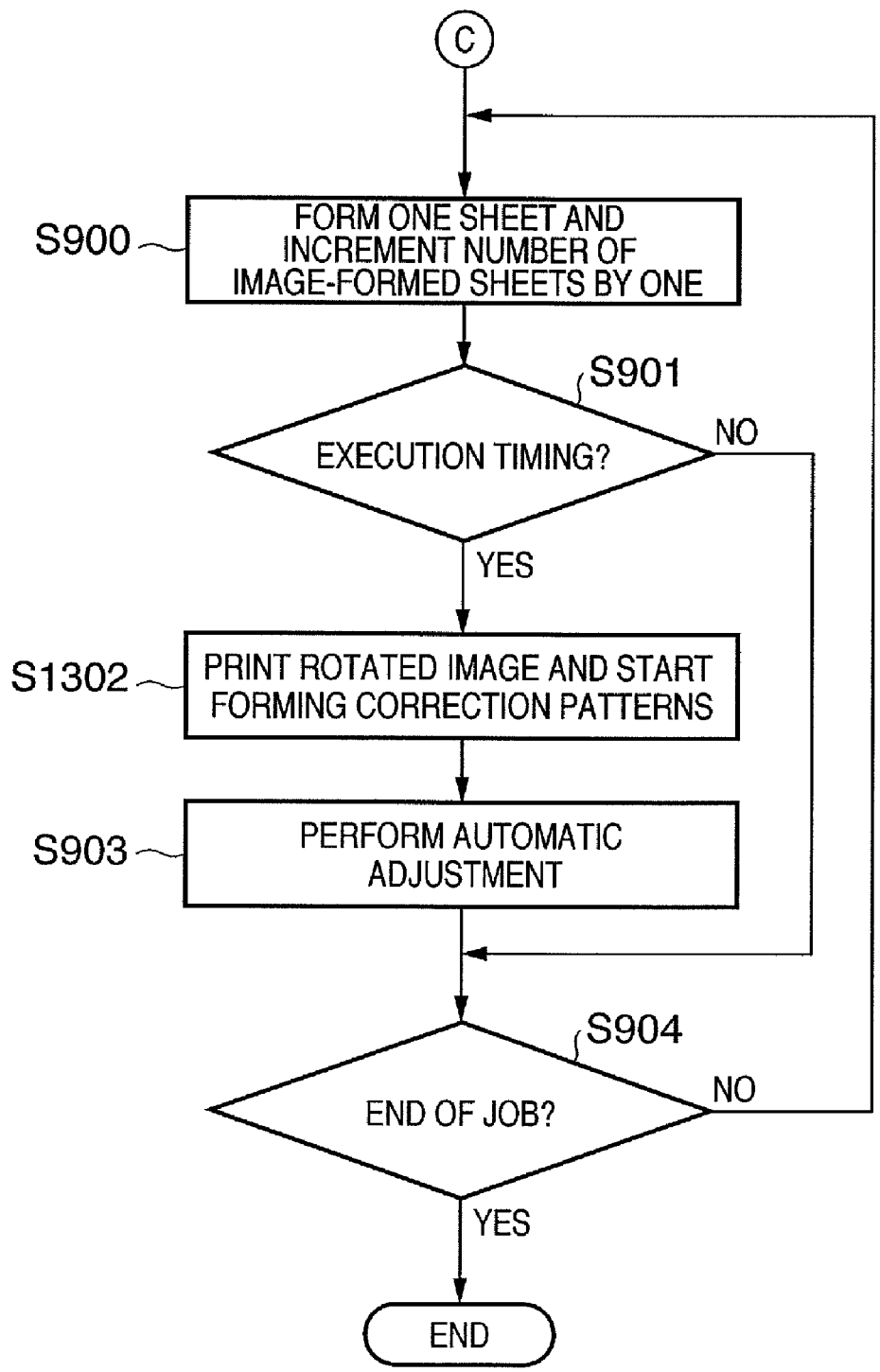
FIG. 13 is a flowchart showing automatic adjustment processing executed while a small-type image is formed according to the embodiment.

FIG. 13 is a flowchart showing automatic adjustment processing executed concurrently with the formation of a small-type image according to this embodiment. Note that the same reference numerals as in FIG. 9 denote the common parts in FIG. 13 to simplify the description. As compared with FIG. 9, step S1302 replaces step S902.

In step S1302, the CPU 202 causes the image placement part 207 to rotate an image. For example, the CPU 202 rotates an A4 image to obtain an A4R image. The CPU 202 then also forms adjustment patterns while forming the rotated image on the intermediate transfer belt 31. Thereafter, in step S903, the CPU 202 reads the adjustment patterns and adjusts the image formation position and image formation density.

Figure 14:
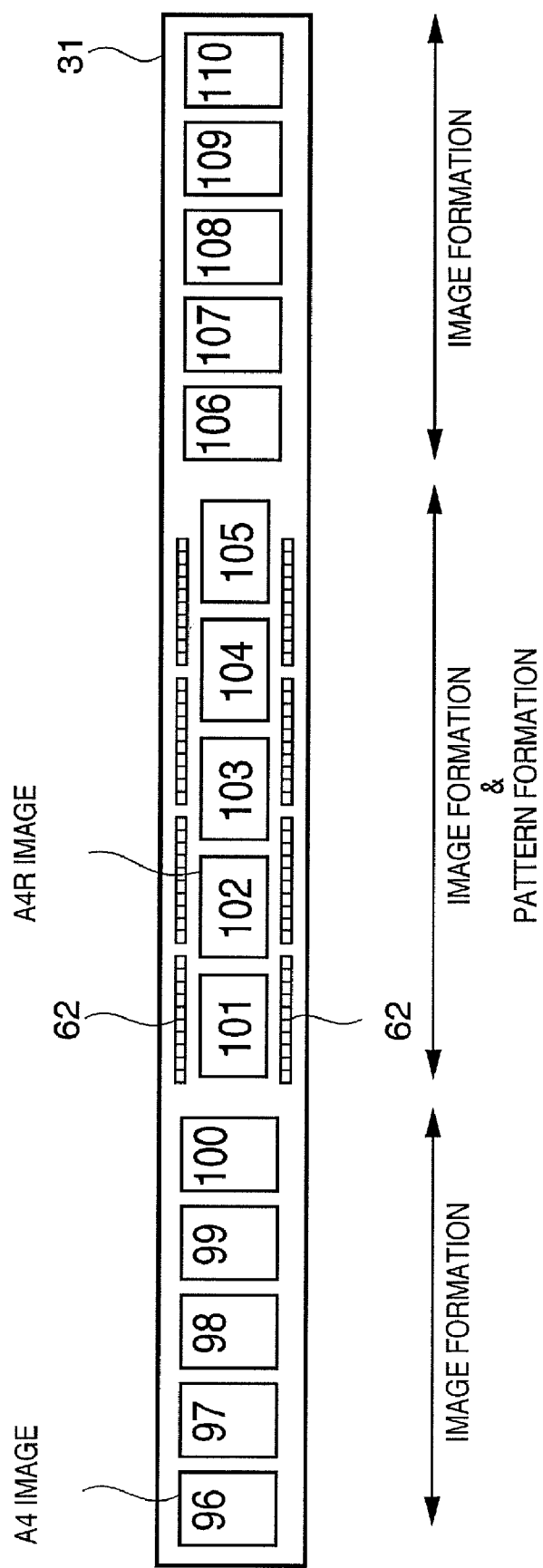
FIG. 14 is a view showing automatic adjustment processing associated with a small-type image according to the embodiment.

FIG. 14 is a view showing automatic adjustment processing associated with a small-type image according to the embodiment. According to this example, when the 100th image is formed, the execution timing has come for automatic adjustment. The CPU 202 then converts a small-type image (e.g., an A4 image) into a small R-type image by rotating the small-type image. This makes it possible to concurrently form a normal image and adjustment patterns, and hence there is no need to interrupt the image formation. This can reduce the down time due to automatic adjustment.

Referring back to the flowchart of FIG. 8, in step S803, the CPU 202 decides whether the number of images constituting one set in a job exceeds a threshold (e.g., an automatic adjustment timing range). An automatic adjustment timing range is the range of the number of images for which automatic adjustment should be executed. Assume that the default execution timing corresponds to the 100th sheet, and the timing range is 10 sheets. In this case, the CPU 202 must start automatic adjustment at the timing from the 96th sheet to the 105th sheet. In addition, it may be compulsory to end automatic adjustment within the timing range.

Consider here a job for M sheets×N sets (M and N are natural numbers). Consider, for example, a case wherein N (e.g., N=10) sets of M (e.g., five) A4 images are formed. Assume that the number of images formed which are required for automatic adjustment is 4.5. In this case, if the 100th sheet corresponds to the end time of image formation of one set (the end time of image formation of the fifth sheet), the adjustment patterns can be appropriately formed from the 101st sheet.

However, since such a case is rare, the CPU 202 specifies a set for which image formation ends within the range of five sheets before and after the 100th sheet (i.e., the range of the 96th sheet to the 105th sheet). If a plurality of sets are specified, the CPU 202 specifies a set whose number of sheets at the end time of image formation becomes closest to a reference number of sheets (e.g., 100 sheets).

The CPU 202 starts forming adjustment patterns simultaneously at the start of image formation for a set next to the set specified in this manner. As described above, if one set comprises five images, the number of sheets of one set falls within the timing range (e.g., 10 sheets). The CPU 202 can therefore concurrently form an image and adjustment patterns. In this case, the process advances to step S804. If the number M of sheets (e.g., 15) of one set exceeds the timing range (e.g., 10) as a threshold, it indicates that there is no suitable execution timing. The process therefore advances to a process A for a large-type image. If the CPU 202 does not execute automatic adjustment even after the lapse of a considerable period of time since the default execution timing, the quality of the image may deteriorate. The process therefore advances to the process A, in which the CPU 202 forcibly interrupts the image formation, and executes automatic adjustment.

For example, in a job accompanied by a stapling process, one set comprises several ten sheets at most in consideration of the stapling ability. In contrast, in a job accompanied by a shift process, one set may comprise 100 or more sheets. In the latter case, the execution timing at which automatic adjustment should be executed (e.g., 100 sheets) may be exceeded. In such a case, it takes a relatively long time to complete the overall job, and hence a time loss due to automatic adjustment can be neglected. In the process A, therefore, it may suffice to perform automatic adjustment upon increasing the sheet-to-sheet interval more than usual.

Although the timing range for automatic adjustment is set to five sheets before and after the 100th sheet (10 sheets), it is merely an example. Assume that the execution timing is set to the 100th sheet, and the timing range is set to 25 sheets before and after the 100th sheet (50 sheets). In this case, the longest interval (worst interval) during which no adjustment is performed corresponds to 150 sheets. That is, this worst interval is 1.5 times the suitable execution timing. On the other hand, the timing range becomes half the suitable execution timing. These numerical values pose no problem in an image forming apparatus which allows rough adjustment to some extent.

Figure 15:
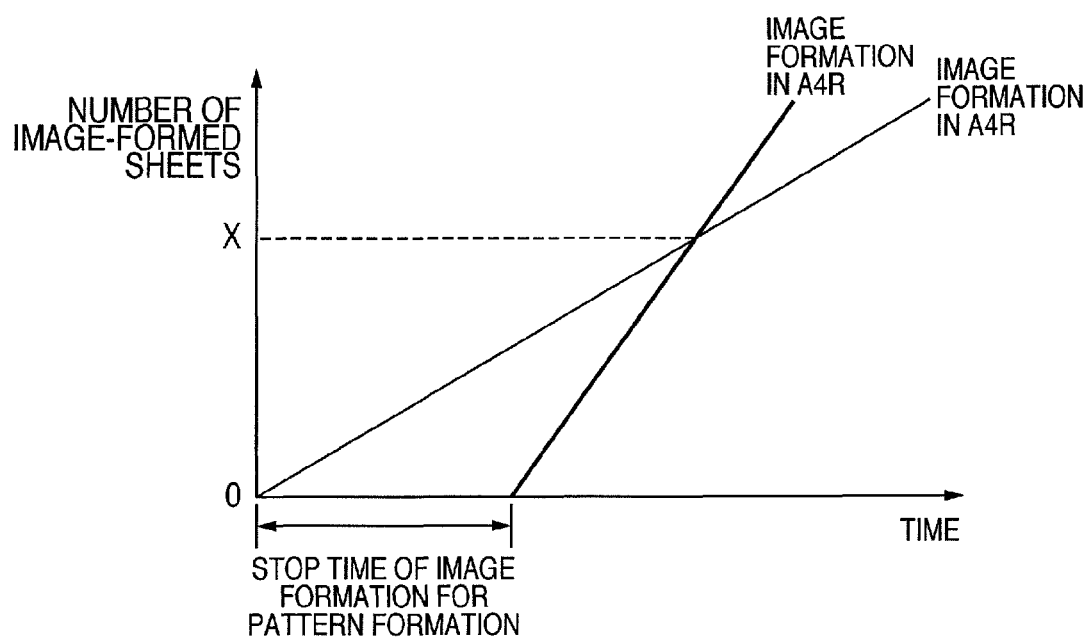
FIG. 15 is a view for explaining an example of how a timing range is determined according to the embodiment.

FIG. 15 is a graph for explaining how a timing range is determined according to this embodiment. In this case, a timing range is determined on the basis of the difference between the productivity for the formation of A4-size images and the productivity for the formation of A4R-size images. In general, an image forming apparatus 100 cannot concurrently form an A4 image and adjustment patterns. On the other hand, the productivity (throughput) for the formation of A4-size images is higher than the productivity for the formation of A4R-size images.

The image forming apparatus 100 can concurrently form an A4R image and adjustment patterns. Obviously, the productivity for the formation of A4R-size images is lower than the productivity for the formation of A4-size images. These facts suggest that there is a number X of image-formed sheets which strikes a balance between the productivity in the case of executing automatic adjustment upon temporarily interrupting the formation of an A4 image and the productivity in the case of executing automatic adjustment while forming an A4R image. The value X changes depending on the type of image forming apparatus, and hence can be empirically obtained.

Referring to FIG. 15, if the number of image-formed sheets is less than X, the productivity in the case of concurrently forming A4R images and adjustment patterns is relatively high. If the number of image-formed sheets exceeds X, the productivity in the case of interrupting the formation of A4 images when forming adjustment patterns is relatively high. It therefore suffices to set a timing range (X sheets) by using such a relationship between productivities.

In step S804, the CPU 202 decides whether the value of the counter reaches n (n is a natural number) times the execution timing (e.g., 100 sheets) before the completion of the job. If NO is decided in step S804, since it indicates that there is no need to perform automatic adjustment, the process advances to step S811. In step S811, the CPU 202 executes normal image formation, and increments the value of the counter by one. If YES is decided in step S804, the process advances to step S805.

In step S805, the CPU 202 determines an execution timing. Note that the CPU 202 may determine the number of images to be formed together with adjustment patterns or the formation time for the images. In step S806, the CPU 202 forms one image and increments the value of the counter by one.

In step S807, the CPU 202 decides on the basis of the value of the counter whether the execution timing has come for automatic adjustment. If the execution time has come for automatic adjustment, the process advances to step S902. If the execution timing has not come, the process advances to step S904.

In step S808, the CPU 202 causes the image placement part 207 to rotate the image. If, for example, the image is an A4 image, the CPU 202 rotates it to obtain an A4R image. The CPU 202 also forms adjustment patterns while forming the rotated image on the intermediate transfer belt 31.

In step S809, the CPU 202 causes the photosensors 60 to read the adjustment patterns, and adjusts the image formation position and image formation density. In step S810, the CPU 202 decides whether to end the job. If NO in step S810, the process returns to step S806 to continue image formation.

Figure 16:
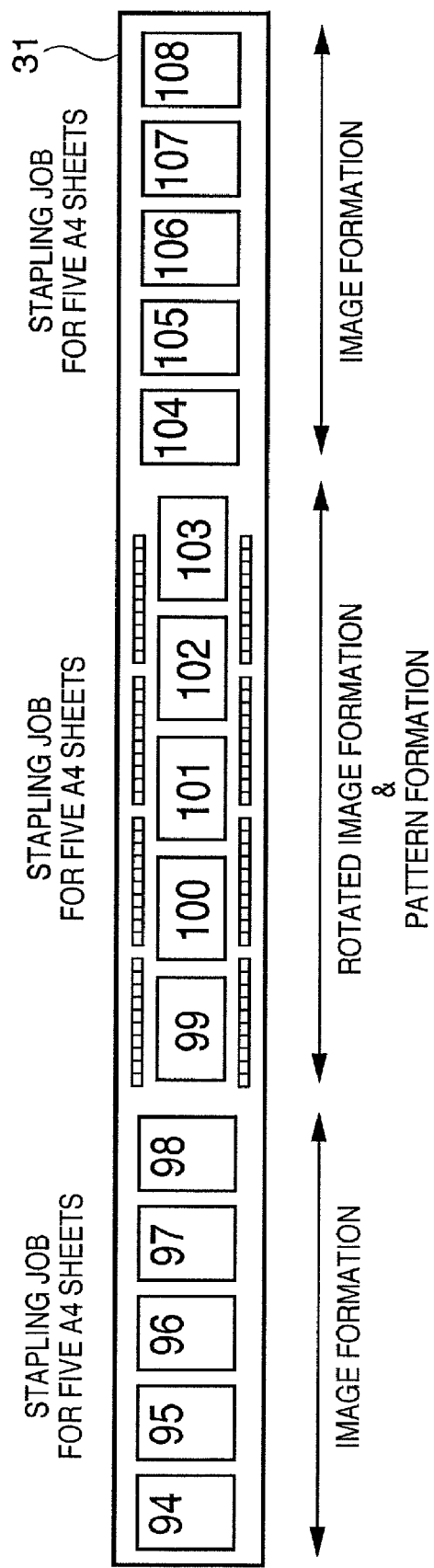
FIG. 16 is a view showing automatic adjustment processing associated with a small-type image according to the embodiment.

FIG. 16 is a view showing automatic adjustment processing associated with a small-type image according to the embodiment. This embodiment uses a stapling job for five sheets×three sets as an example. Assume that the initial automatic adjustment execution timing corresponds to 100 sheets. Assume also that the timing range is set to five sheets. As shown in FIG. 16, the first set ends at the 98th sheet, and the second set ends at the 103rd sheet. The CPU 202 therefore determines the end time of the 98th sheet (the start time of the 99th sheet) nearest to the 100th sheet as the execution timing (S805). The CPU 202 then concurrently forms a rotated image and adjustment patterns from the end time of the 98th sheet which is determined as the execution timing.

Note that the stapling job defines that one set comprises five sheets. Therefore, the formation of rotated images starts from the 96th sheet and ends at the 103rd sheet or ends at the 108th sheet at which the succeeding set ends. The set up to which images are to be rotated depends on the time required for automatic adjustment.

As has been described above, according to this embodiment, deciding whether automatic adjustment can be executed while the image based a job requiring post processing is formed on an image carrier makes it possible to suitably execute automatic adjustment in accordance with the type of post processing.

If the CPU 202 cannot execute automatic adjustment while forming an image when the execution timing has come for automatic adjustment, the CPU 202 interrupts image formation and executes automatic adjustment (process A). For example, the CPU 202 cannot execute automatic adjustment concurrently with image formation depending on the type of post processing or the size of an image. However, the quality of an image deteriorates unless automatic adjustment is executed. In this case, therefore, the CPU 202 temporarily interrupts image formation, and then executes automatic adjustment. Note that there is no need to immediately interrupt image formation when the execution timing has come for automatic adjustment. This is because it is not preferable to interrupt image formation in the middle of a set or the like.

Assume that the CPU 202 is to execute a job for M sheets×N sets (M and N are natural numbers), and M exceeds a threshold such as a timing range. In this case, the CPU 202 may interrupt image formation and execute automatic adjustment after further forming a predetermined reference number of images. That is, since it is not preferable to execute automatic adjustment in the middle of a set, the CPU 202 can interrupt image formation and automatic adjustment at the end time of the set.

According to the present invention, adjustment processing can be suitably executed in accordance with the type of post processing. In addition, according to the present invention, the down time due to automatic adjustment can be easily reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-358160, filed Dec, 12, 2005, which is hereby incorporated by reference herein in its entirety.

What is claimed is:

1. An image forming apparatus comprising:
   an image carrier which carries an image formed by a developing material;
   an adjustment part which performs at least one of adjustment operations for an image formation position and an image formation density by forming an adjustment pattern using a developing material on said image carrier and measuring the adjustment pattern;
   a specifying part which, in case of executing a job which requires post processing for an image-formed sheet, specifies a size of an image to be formed on the image-formed sheet and a content of the post processing; and
   a control part which controls whether to perform the adjustment operation by said adjustment part concurrently with formation of an image made from the job requiring the post processing, in accordance with the specified size of the image and the specified content of the post processing;
   wherein said control part further comprises a decision part which decides, in accordance with the specified size of the image and the specified content of the post processing, whether processing of forming, on said image carrier, an image made from a job requiring post processing for the image-formed sheet, can be executed concurrently with adjustment operation by said adjustment part, and
   wherein said control part operates said adjustment part concurrently with formation of the image made from the job requiring the post processing, or forms an image without operating said adjustment part, on the basis of a decision result obtained by said decision part.

2. An image forming apparatus claimed in claim 1, further comprising an image rotation part which rotates the image to secure a formation area for the adjustment pattern on said image carrier.

3. An image forming apparatus claimed in claim 2, wherein said decision part further comprises a distinguishing part which distinguishes whether the post processing can be executed even if said rotation part rotates the image to secure the formation area for the adjustment pattern on said image carrier.

4. An image forming apparatus claimed in claim 3, wherein one type of post processing which can be executed even if the image is rotated is one of a stapling process of stapling a sheet bundle and a shift process for sorting a plurality of sheet bundles.

5. An image forming apparatus claimed in claim 3, wherein one type of post processing which cannot be executed if the image is rotated is a punch process.

6. An image forming apparatus comprising:
   an image carrier which carries an image formed by a developing material;
   an adjustment part which performs at least one of adjustment operations for an image formation position and an image formation density by forming an adjustment pattern using a developing material on said image carrier and measuring the adjustment pattern;
   a specifying part which, in case of executing a job which requires post processing for an image-formed sheet, specifies a size of an image to be formed on the image-formed sheet and a content of the post processing;
   a control part which controls whether to perform the at least one of adjustment operations by said adjustment part concurrently with formation of an image made from the job requiring the post processing, in accordance with the specified size of the image and the specified content of the post processing; and
   a determination part which determines an execution timing for the at least one of adjustment operations on the basis of the number of image-formed sheets, wherein said control part executes the adjustment after interrupting image formation, if the at least one of adjustment operations cannot be executed concurrently with image formation when the determination execution timing has come.

7. An image forming apparatus comprising:
   an image carrier which carries an image formed by a developing material;
   an adjustment part which performs at least one of adjustment operations for an image formation position and an image formation density by forming an adjustment pattern using a developing material on said image carrier and measuring the adjustment pattern;
   a specifying part which, in case of executing a job which requires post processing for an image-formed sheet, specifies a size of an image to be formed on the image-formedsheet and a content of the post processing;
   a control part which controls whether to perform the at least one of adjustment operations by said adjustment part concurrently with formation of an image made from the job requiring the post processing, in accordance with the specified size of the image and the specified content of the post processing; and
   wherein said control unit interrupts image formation and executes the at least one of adjustment operations after images are formed on a reference number of sheets, in case of the job is a job for M sheets×N sets (M and N are natural numbers), and M exceeds a threshold.

8. A control method for an image forming apparatus which forms an image by using an image carrier for carrying an image using a developing material, comprising the steps of:
   in case of executing a job which requires post processing for an image-formed sheet, specifying a size of an image formed on the sheet and a content of the post processing; and controlling, in accordance with the specified size of the image and the specified content of the post processing, whether to perform adjustment operation concurrently with image formation of an image on the image carrier, the image is made from a job requiring post processing for a sheet on which the image is formed, and the adjustment operation is an operation of adjusting at least one of an image formation position and an image formation density by forming an adjustment pattern using a developing material on the image carrier and measuring the adjustment pattern;
   wherein said controlling further comprises deciding, in accordance with the specified size of the image and the specified content of the post processing, whether processing of forming, on said image carrier, an image made from a job requiring post processing for an image-formed sheet, can be executed concurrently with said adjustment operation by said adjustment part; and
   controlling said adjustment operation concurrently with formation of the image made from the job requiring the post processing, or forming an image without adjustment, on the basis of a decision result obtained by said deciding.

* * * * *

UNITED STATES PATENT AND TRADEMARK OFFICE
CERTIFICATE OF CORRECTION

| | |
|---|---|
| PATENT NO. | : 7,903,279 B2 |
| APPLICATION NO. | : 11/608424 |
| DATED | : March 8, 2011 |
| INVENTOR(S) | : Junichi Noguchi et al. |

Page 1 of 1

It is certified that error appears in the above-identified patent and that said Letters Patent is hereby corrected as shown below:

In the Claims section, Claim 7 should appear as follows:

Column 16, line 24, claim 7: correct to read --image-formed sheet--

Signed and Sealed this
Seventeenth Day of May, 2011

David J. Kappos
*Director of the United States Patent and Trademark Office*